United States Patent
Laird et al.

(10) Patent No.: US 7,818,742 B2
(45) Date of Patent: Oct. 19, 2010

(54) PORTAL FEDERATED APPLICATIONS AND PORTAL FEDERATED WEB APPLICATIONS

(75) Inventors: Peter Laird, Superior, CO (US); Mark Griffith, Issaquah, WA (US); Vinod Mehra, Alameda, CA (US); Rob Woollen, San Francisco, CA (US); Michael Jasnowski, Amherst, NH (US)

(73) Assignee: BEA Systems, Inc., Redwood Shores, CA (US)

( * ) Notice: Subject to any disclaimer, the term of this patent is extended or adjusted under 35 U.S.C. 154(b) by 1503 days.

(21) Appl. No.: 11/131,579

(22) Filed: May 18, 2005

(65) Prior Publication Data

US 2006/0010196 A1 Jan. 12, 2006

Related U.S. Application Data

(60) Provisional application No. 60/573,279, filed on May 21, 2004.

(51) Int. Cl.
*G06F 9/445* (2006.01)
*G06F 9/44* (2006.01)

(52) U.S. Cl. ............... 717/177; 717/169; 717/172; 717/175

(58) Field of Classification Search ............ None
See application file for complete search history.

(56) References Cited

U.S. PATENT DOCUMENTS

| 6,131,192 | A | * | 10/2000 | Henry | 717/175 |
| 6,772,165 | B2 | * | 8/2004 | O'Carroll | 1/1 |
| 6,862,616 | B1 | * | 3/2005 | Tompkins | 709/223 |
| 6,892,382 | B1 | * | 5/2005 | Hapner et al. | 717/174 |
| 2004/0128347 | A1 | * | 7/2004 | Mason et al. | 709/203 |
| 2004/0133660 | A1 | * | 7/2004 | Junghuber et al. | 709/219 |

OTHER PUBLICATIONS

Weisong Shi and Vijay Karamcheti, CONCA: An Architecture for Consistent Nomadic Content Access, Workshop on Caching, Coherence and Consistency (WC3 '01), Sorrento, Italy, Jun. 17, 2001.*
Pei Cao, Jin Zhang and Kevin Beach, Active Cache: caching dynamic contents on the Web, Mar. 1, 1999, Journal Distributed Systems Engineering, Issue vol. 6, No. 1.*

* cited by examiner

*Primary Examiner*—Lewis A Bullock, Jr.
*Assistant Examiner*—Chris Nelson
(74) *Attorney, Agent, or Firm*—Fliesler Meyer LLP (57) ABSTRACT

A customer portal application can reference a module. The files of the module can be combined with the files of the customer portal application wherein the files of the customer portal application take precedence.

21 Claims, 9 Drawing Sheets

PORTAL FEDERATED APPLICATIONS AND PORTAL FEDERATED WEB APPLICATIONS

CLAIM OF PRIORITY

This application claims priority to U.S. Provisional Application No. 60/573,279 entitled "Portal Federated Applications and Portal Federated Web Applications" filed May 21, 2004.

FIELD OF THE INVENTION

The present invention is directed to portal technology.

BACKGROUND

Portals can provide access to information networks and/or sets of services through the World Wide Web and other computer networks. Portals can provide a single point of access to data and applications, making them valuable to developers, businesses, and consumers alike. A portal can present a unified and personalized view of enterprise information to employees, customers, and business partners. In many implementations, portal applications can include web application views designed as a portal.

Portals are capable of presenting multiple web application views within a single web interface. In addition to regular web content that can appear in a portal, portals provide the ability to display portlets (self-contained applications or content) in a single web interface. Portals can also support multiple pages with menu-based or custom navigation for accessing the individualized content and portlets for each page.

A working portal can be defined by a portal configuration. The portal configuration can include a portal definition such as a file including Extensible Markup Language (XML); portlet definition files for any portlets associated with the portal; java server pages (JSPs); web application descriptors; images such as graphics interchange format files (GIFs); deployment descriptors, configuration files, the java archive (JAR) files that contain the logic and formatting instructions for the portal application; and any other files necessary for the desired portal application.

DETAILED DESCRIPTION

Portals can provide access to information networks and/or sets of services through the World Wide Web (WWW) or other computer networks. These networks can range from broad interconnections of computing systems such as the Internet to localized area networks including a few computers located in close geographic proximity such as a home or office. Portal applications can include web application views designed as a portal.

Portlets can be implemented as java server pages (JSPs) referenced by XML-based metadata of the portal descriptor. Portlets can utilize various types of display code to display highly focused information directed to a specific user or user group, having a portal as its container. Portlets can be comprised of portlet components which include portlet attributes (i.e. whether the portlet is editable, floatable, minimizable, maximizable, helpable, mandatory, has defaults minimized, or whether login is required) and portlet layout elements or components (i.e. banner, header, content, and footer sections). In one embodiment, a portlet is defined by a file that contains a portlet's XML-based metadata, which is created and edited by an integrated design environment or administration tool. Portlets can also be associated with portlet resource files including skeleton JSPs (one for each portlet layout element) and image files saved to a local file system by a portal designer of integrated design environment.

Figure 1:
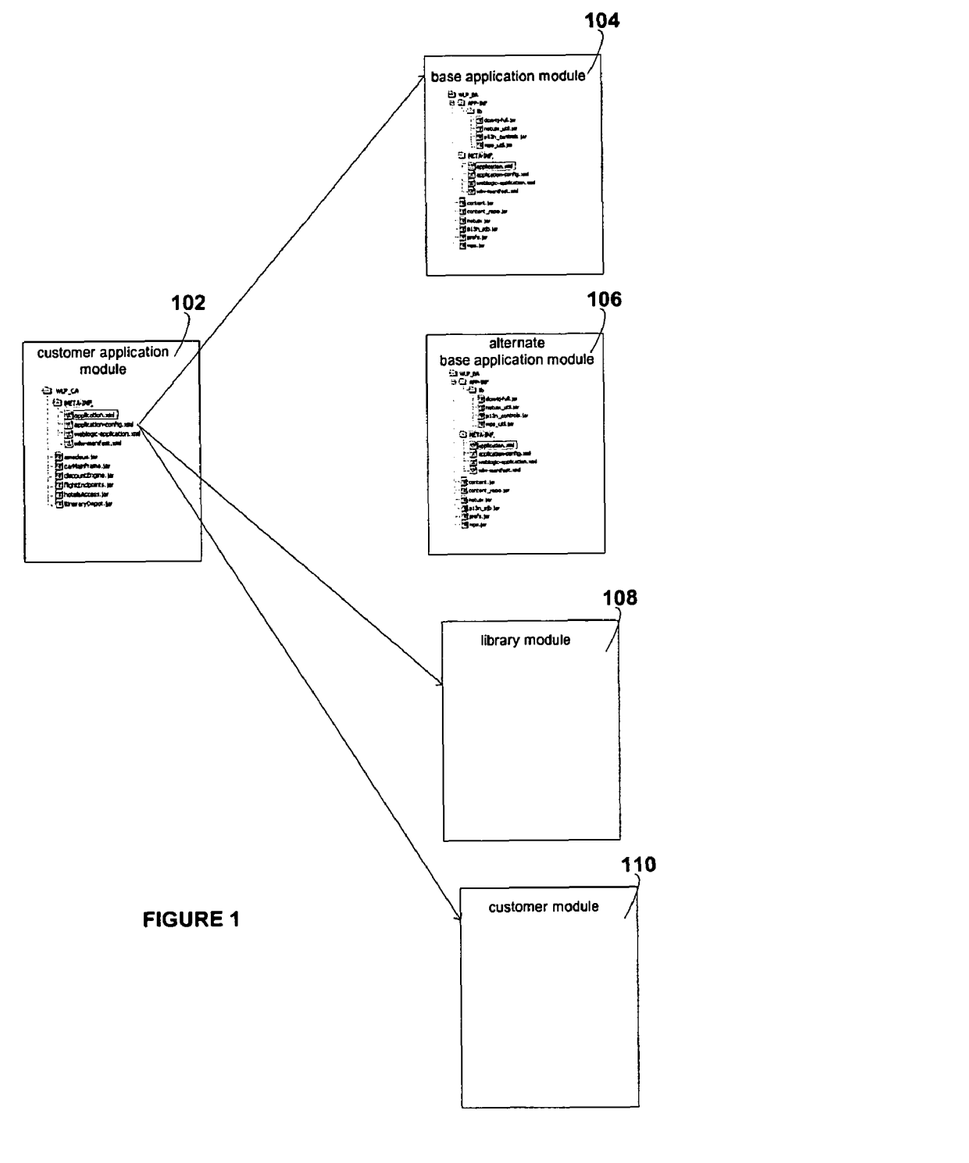
FIG. 1 is a diagram illustrating the combination of a base application module and a customer application.

FIG. 1 shows a system 100 of one embodiment of the present invention. The system 100 includes a customer portal application including a number of files; and a module 104 including additional files. A portal is constructed from the files in the customer portal application 102 and the module 104. Files in the customer portal application can override any files in the module with the same filename.

The files can include class files. The filename can include a portion of the path information. In one example, a file "/foobar/myimage/foo.jpg" in the customer portal application would take priority over a file named "/foobar/myimage/foo.jpg" in the module, but one named "/foobar/test/foo.jpg" would not.

The customer portal application can reference the module. The reference to the module can cause the module to be deployed. The reference can be in an XML file of the customer portal application 102, such in the file "application-config.xml".

In one embodiment, the server has a "config.xml" file which is used to register all of the modules. A module reference in the "application-config.xml" file is compared to the information in the "config.xml" file for the server. If the references to the modules match, the files in the module, such as the base application module 104, can be deployed along with the files in the customer application 102.

The modules can be archived into an archive file, such as a JAR, WAR, or EAR file.

The module can be a base application module. The base application module can contain information provided to the developer with a portal product. Keeping files in a base application module makes deployment and updates much easier. The base application module can be updated to form an updated base application module. The updated base application module can be combined with the customer portal application to easily update the system.

Figure 4A:
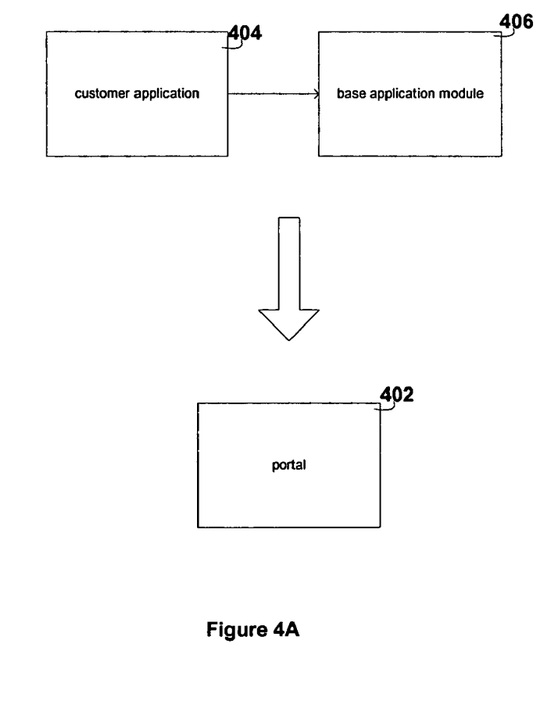
FIGS. 4A and 4B illustrates advantages of one embodiment of the system of the present invention.
Figure 4B:
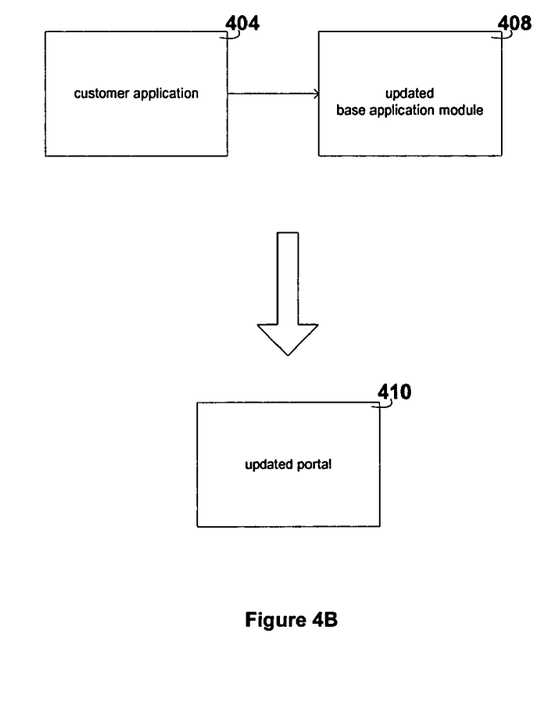

FIGS. 4A and 4B illustrate this advantage. In FIG. 4A, a portal 402 is constructed from the customer application 404 and the base application module 406. In FIG. 4B, the customer application 404 and the updated base module 408 combine to form the updated portal 410. The customer application 404 does not change, but an updated base application module 408 is added. The updated base application module 408 can include all the changes to the files for a portal product update. The deployment of an update does not require the customer to go thought the JAR and other files within the customer application 404 to find the files to update. By separating the files into the modules, the deployment is made much easier.

An alternate base application module 106 can be used. The alternate base module can contain files for a different configuration of the portal. Library module 108 can include additions to the system. In one embodiment, a customer module 110 containing files produced by the customer can also be used. The customer application module 102 can then reference the customer module to add files the files of the customer module to the total application.

In one embodiment, the precedence of the modules is determined by the order of the references to the modules by the customer application. For example, in one ordering, the files of the customer application module are checked first, followed by the files of the base application module, library module, and customer module, assuming that these modules are referenced in this order within the customer application module.

Appendix I shows details of Federated Application for use with a server product that can be used with the system of one embodiment of the present invention.

The customer portal application can include customer web portal applications. A file of customer portal application can be an archive file of the customer web portal application. The files in the customer portal web application and files in a web module can be combined. The web module can be a base web module and each customer web portal application can inherit the base web module. The customer web portal application can reference the web module. The files in the customer portal web application can override any files in the web module with the same filename. The web module can include portal elements, such as desktops, pages, books, portlets JSP content and others.

Figure 2:
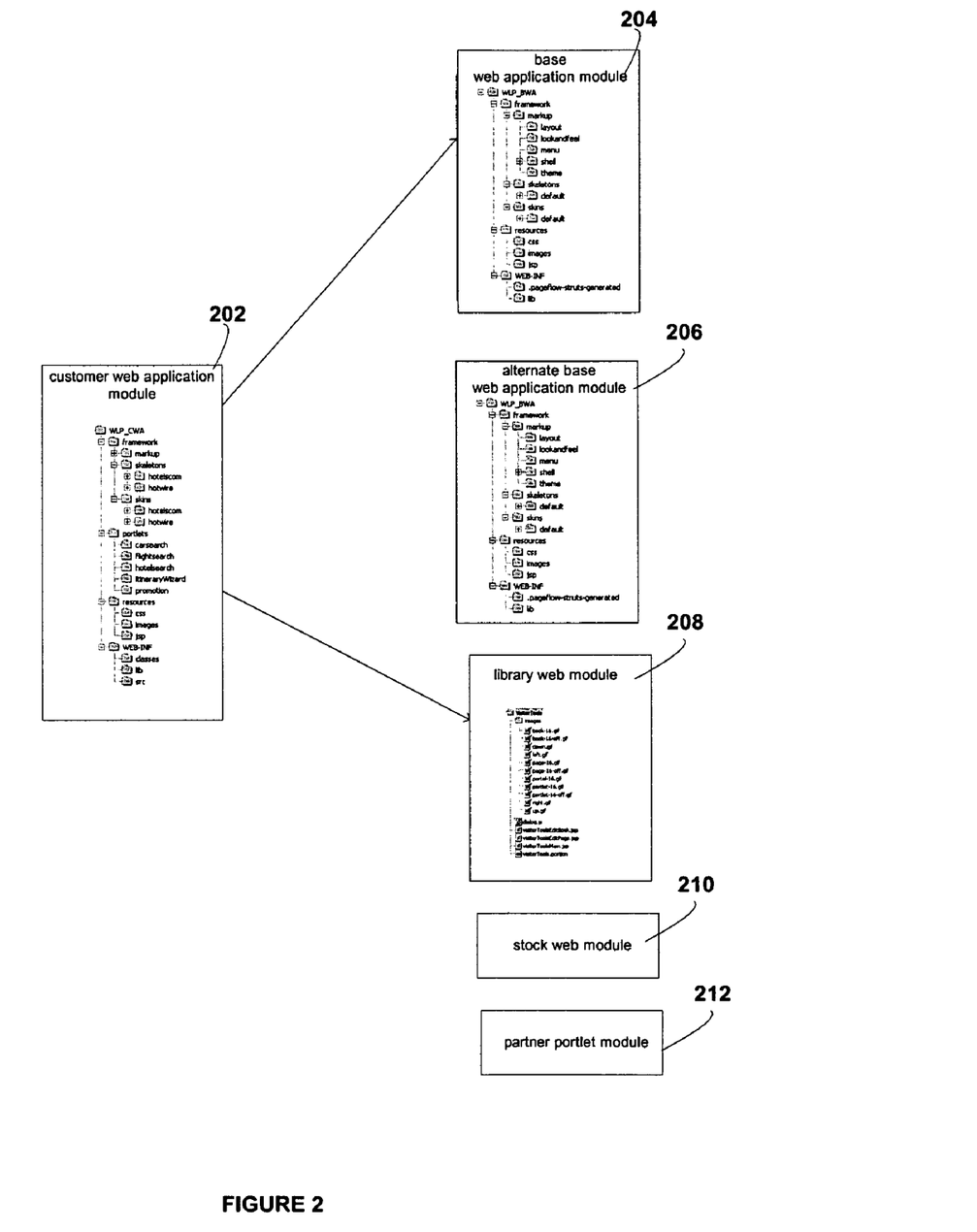
FIG. 2 is a diagram illustrating the combination of a customer web application with a web application module.

FIG. 2 shows one example of an embodiment of the present invention. A customer portal web application 202 includes a number of files. A web module 204 includes additional files. The files can contain portal elements such as desktops, pages, books, portlets JSP content and others. The portal can be constructed from files in the customer portal web application 202 and the web module 204, wherein files in the customer portal web application can override any files in the web module with the same filename. The filename can include path info.

The customer web portal application can be part of a customer portal application. A file of customer portal application can be an archive file of the customer web portal application. The web module can be a base web module. Each customer web portal application can inherit the base web module. The customer web portal application 202 can reference the web module 204. The reference to the web module can cause the web module 204 to be deployed. The web module can be archived into an archive file.

An alternate base web application module 206 can also be used. In the example of FIG. 2, a library web module 208 is also referenced by the customer application module 202. Additional modules can include stock web modules 210 and partner modules, such as partner portlet module 212.

Appendix II shows details of Federated Web Application and extensions for use with a server product that can be used with the system of one embodiment of the present invention.

Figure 3:
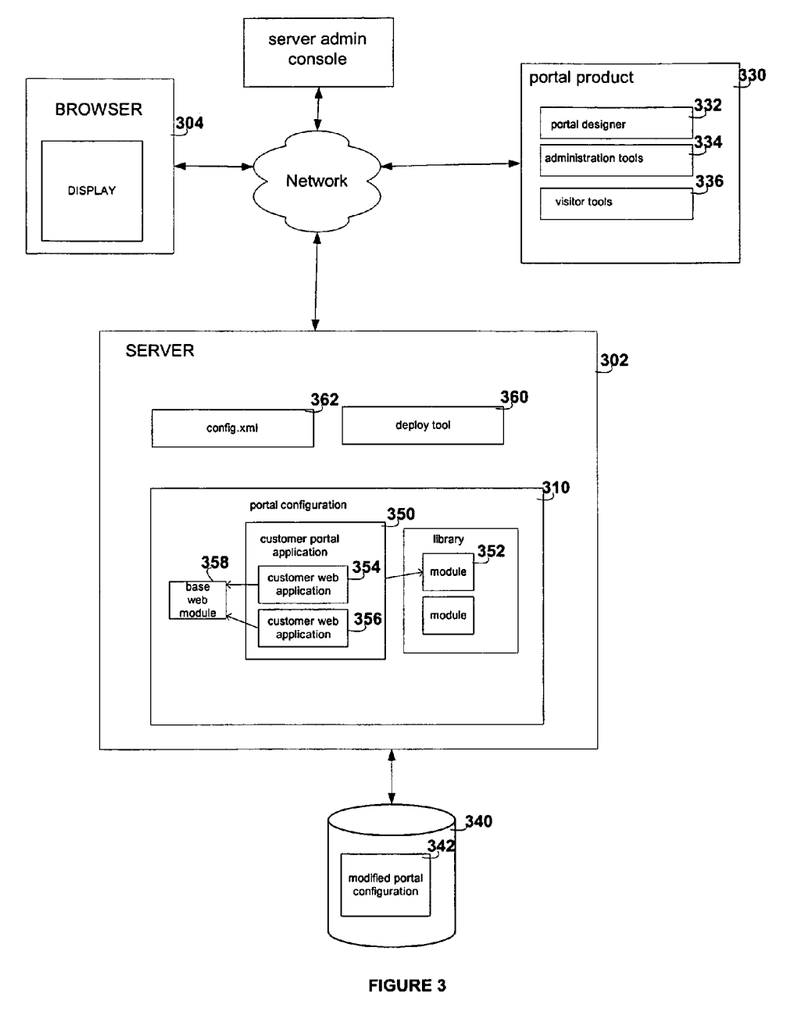
FIG. 3 is a diagram of a system of one embodiment of the present invention.

FIG. 3 illustrates a system for implementing one embodiment of the present invention. Server 302 can be used to produce a portal for display at the browser 304. In one embodiment, the server 302 produces a portal display in response to a request from the browser client 304. The portal can be configured for different users and different group of users, where different portlets can be displayed based upon a user's group or role. The server 302 can use a portal configuration 310. In example of FIG. 3, a customer portal application 350 references a module 352 in the library. The deployment tool 360 checks the reference against the config.xml file 362. If the references is to a registered module, then the module 352 and its files are deployed. Customer web applications 354 and 356 contained within the customer portal application 350 can reference a base web module 358. The files of the base web module 358 are then combined with the customer web applications 354 and 356. A portal can be produced and displayed at the browser 304 from the information in the combined files. In one embodiment, the deployed portal information can be loaded as a modified portal configuration 342 into the database 340.

The server 302 can be software that can be run on one or more server machines. In one embodiment, the server 302 is a WebLogic Server™ available BEA Systems Inc., of San Jose, Calif.

A portal product 330 can be an Integrated Design Environment (IDE) for producing the portal. In one embodiment, the IDE includes a portal designer 332 for the design of the portal, portlets and other portal elements. The administration tools 334 and visitor tools 336 are used for producing versions of the portal. In one embodiment, the different versions uses the portal configuration 310 to produce a modified portal configuration 342 that can be stored in a database 340. Portals can be produced from the database 340, a cache or directly from the portal configuration 310.

Appendix III shows a non-limiting example of one embodiment of the present invention.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nanoscale systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

APPENDIX I

Federated applications can be configured to use both modules created for the applications as well as library modules which perform commonly used functions. The modules such as the library modules can be stored separately for deployment when utilized by applications. A deployment descriptor can configured with descriptions of internal modules and references to library modules. A deployment tool can read the deployment descriptor, extracts the library modules according to the information stored in the deployment descriptor, and load the modules specific to the application.

The library modules can be commonly-used modules that can be stored for deployment with created applications. The library modules can be stored in Java ARchive (JAR) files. In one embodiment, each JAR file stores a single library module. In an alternate embodiment, multiple library modules are stored in a single JAR file. The library modules can include a manifest identifying the library module, class files, a deployment descriptor, and additional resources.

The library modules can be registered with the server by including a reference to the library in the server's configuration parameters. In one embodiment, the configuration parameters include a config.XML file. When starting, the server detects the reference to the library and generates a configuration bean associated with the library. The reference to the library preferably includes a unique name for the library, a type for the library, a version of the library, and a location of the JAR file storing the library. One embodiment of a config.XML entry for a library file is disclosed below:

```
<LibraryModule
    LibraryName="BA1"
    LibraryType="rar"
    ImplementationVersion="8.1"
    ImplementationURL="file:///usr/local/bal.rar"
/>
```

The applications can include application modules which are modules that have been created for the particular application and are either not commonly utilized or not commonly utilized enough to justify their inclusion with the library modules. The applications can also include deployment descriptors. In one embodiment, the deployment descriptor is an application.xml file. The deployment descriptor can include information necessary for representing the application in different GUI tools, elements indicating each module used in the application, its type, and its path in the EAR file storing the application. Additionally, the application deployment descriptor can include references to the library modules used by the application. The reference to the library module can include the library name, which uniquely identifies the library and is compared to the library name included in either the library's manifest or the config.XML file. It can also includes the implementation version, which is the minimum implementation version needed by the application. A deployment tool can compare this value with the implementation version stored in the config.XML file to verify that the two match. Finally, the entry can include a module-url which indicates a location on the server 105 where the library module can be located. Below is one example of an application-.xml file which references library modules

```
<application>
    <display-name>ExampleApplication</display-name>
    <description>Example</description>
    <library-module>
        <library-name>WorkFlowEJB</library-name>
        <implementation-version>8.1</implementation-version>
        <module-url>workflow.jar</module-url>
    </library-module>
    <module>
        <ejb>ejb1.jar</ejb>
    </module>
    <module>
        <ejb>ejb2.jar<ejb>
    </module>
    <module>
        <web>
            <web-uri>web.war</web-uri>
            <context-root>web</context-root>
        </web>
    </module>
</application>
```

The deployment tool can be responsible for deploying the applications 120 from the server storage to generate the deployed applications. In one embodiment, the deployment tool runs when the server is started and automatically deploys a group of preselected applications. In an alternate embodiment, the deployment tool allows a system administrator to manually select which applications are deployed.

The deployment tool, when deploying an application can check the deployment descriptor. The deployment tool can first checks the library module reference to determine whether there are any library modules referenced by the application. If so, the deployment tool can use the identifier for the library module to locate the library module on the server storage. The deployment tool can then extracts any referenced library modules from the JAR files in which the library file is archived in the order in which the library modules are listed in the deployment descriptor. Alternately the deployment tool can directly deploy the library module from the location where it is stored. If the JAR file contains multiple library modules, all of the library modules in the JAR file are deployed. The deployment tool can then deploy any application modules within the application.

The library module can include a manifest, class files, a deployment descriptor, and additional resources. The manifest can store information for uniquely identifying the module to the web server and can include the library name, implementation title, and implementation version. In some embodiments, the manifest also includes a specification version indicating a minimum extension specification version that is needed for extensions to the library module. In these embodiments, the key that is used for identifying a library module consists of name/specification version/implementation version.

The library name can be a unique identifier used to identify the module. The library name can be used by the deployment tool to identify the module when referenced by the application.xml file in the application. The implementation title can be a string that uniquely identifies the title of the library implementation. The implementation version can indicate a version of the implementation of the library module that is stored on the server storage. The web server can compare the implementation version and library name of the stored library module to the name and implementation version in the application.xml file of the associated application. In one embodiment, if the library name and implementation version do not match, the deployment tool will not extract the library module.

The library module can also include class files. The class files can be classes which contain the functionality of the module. The library module can also include additional resources. The additional resources can include static content files for use by the library module. The library module additionally can include a deployment descriptor. The deployment descriptor can include information necessary for representing the library module in different GUI tools, elements indicating each module used in the library module and its type and path in the JAR file storing the library module. Alternately, the library module can include a standard web-application deployment descriptor.

APPENDIX II

The resources provided by web applications can be extended through the implementation of library modules and extensions. Library web modules stored outside a web application can provide resources in a web application environment as if they were part of the web application itself. Additionally, web applications can be configured with application extensions that are web applications stored as archives within containing web applications.

The server storage can store web applications. These web applications can be stored in archives such as Web ARchive (WAR) files.

The server storage can also includes library web modules. The library modules can be commonly-used modules that are stored for deployment with created web applications. The library web modules can be stored in Web ARchive (WAR) files. In one embodiment, each WAR file stores a single library module. In an alternate embodiment, multiple library modules are stored in a single WAR file. The library web modules can include a manifest identifying the library module, class files, a deployment descriptor, and additional resources. The library web modules can include resources that are utilized by portal applications as front end components. These resources can include Java Server Pages (JSPs), classes, servlets, links to outside resources, and static resources such as HTML pages and graphical content.

The library web modules can be typically registered with the server by including a reference to the library in the server's configuration parameters. In one embodiment, the configuration parameters can include a config.XML file. When starting, the server can detect the reference to the library and generates a configuration bean associated with the library. The reference to the library can includes a unique name for the library, a type for the library, a version of the library, and a location of the WAR file storing the library. One embodiment of a config.XML entry for a library file is disclosed below:

```
<LibraryModule
    LibraryName="BA1"
    LibraryType="war"
    ImplementationVersion="8.1"
    ImplementationURL="file:///usr/local/bal.war"
/>
```

The web applications can include resources which are modules that have been created for the particular web application and are either not commonly utilized or not commonly utilized enough to justify their inclusion with the library modules. As with the library web modules, these resources can include JSPs, classes, servlets, links to outside resources, and static resources such as HTML pages and graphical content. The web applications can also include extension modules. The extension modules are modules residing within the web application that extend the functionality of the web application. The extension modules can be WAR files that are stored with a JAR (Java ARchive) file extension, structured with a web application file organization, and stored in a directory of the web application. This structure enables a developer to take a portlet and its component resources, package them into a JAR file and include them in an existing application without any need for separate registration. The extension modules may include their own deployment descriptors such as web.xml and weblogic.xml files.

The web applications can also include deployment descriptors. In one embodiment, the deployment descriptors include a web.xml file and a weblogic.xml file. The deployment descriptors can include information necessary for representing the web application in different GUI tools, elements indicating each module used in the web application, its type, and its path in the WAR file storing the web application. Additionally, the web application deployment descriptors can include references to the library modules utilized by the web application. The reference to the library module includes the library name, which uniquely identifies the library and is compared to the library name included in either the library's manifest or the config.XML file. It also includes the implementation version, which is the minimum implementation version needed by the web application to use the library module correctly. The deployment tool can compare this value with the implementation version stored in the config.XML file to verify that the two match. Finally, the entry includes a module-url which indicates a location on the server where the library module can be located. Below is one example of a section of a web.xml file that refers to a web application module.

```
<web application>
    <display-name>ExampleWeb application</display-name>
    <description>Example</description>
    <library-module>
        <library-name>resource1</library-name>
        <implementation-version>8.1</implementation-version>
        <module-url>workflow.war</module-url>
    </library-module>
```

The deployment tool is responsible for deploying the web applications from the server storage to generate the deployed web applications in a web server. The web server can be a conventional web server that acts as a web-access and application platform. One example of a web server product is WebLogic Server by BEA systems of San Jose, Calif.

In one embodiment, the deployment tool runs when the server is started and automatically deploys a group of preselected web applications. In an alternate embodiment, the deployment tool allows a system administrator to manually select which web applications are deployed.

The deployment tool, when deploying a web application can check the deployment descriptor. The deployment tool can first checks for a library module reference to determine whether there are any library modules referenced by the web application. If so, the deployment tool can use the identifier for the library module to locate the library module on the server storage. The deployment tool can then retrieves any referenced library modules from the WAR files in which the library file is archived in the order in which the library modules are listed in the deployment descriptor. If the WAR file contains multiple library modules, all of the library modules in the WAR file are deployed. The deployment tool then deploys any web application modules within the web application, including any extension modules.

The DefaultWebApp directory is a subdirectory on the server storage that stores files associated with a web application. The DefaultWebApp includes a WEB-INF directory, which stores deployment information for the web application and in its subdirectories, the resources provided by the web application. The WEB-INF directory can includes a libraries subdirectory. The libraries subdirectory can includes JAR files used by the web application, including tag libraries. A classes subdirectory can include server-side classes such as servlets and utility classes. A web.xml deployment descriptor file can include information for deploying the web application, such as identifiers for the application, a listing of resources provided by the application, identification of library modules and identification of any extension modules within the application. A weblogic.xml deployment descriptor can include server-specific deployment information. In some embodiments, the extension modules can be referenced in the weblogic.xml deployment descriptor. An extensions subdirectory can include extension modules stored as JAR files.

The library module can include a manifest, resources, and a deployment descriptor. The manifest can store information for uniquely identifying the module to the web server and includes the library name, implementation title, and implementation version. In some embodiments, the manifest can also include a specification version indicating a minimum extension specification version that is needed for extensions to the library module. In these embodiments, the key that is used for identifying a library module can be formatted as name/specification version/implementation version.

The library name can be the unique identifier used to identify the module. The library name can be used by the deployment tool to identify the module when referenced by the web.xml file in the web application. The implementation title can be a string that uniquely identifies the title of the library implementation. The implementation version can indicates a version of the implementation of the library module that is stored on the server storage. The web server can compare the implementation version and library name of the stored library module to the name and implementation version in the web.xml file of the associated web application. In one embodiment, if the library name and implementation version do not match, the deployment tool will not deploy the library module.

The library module also includes resources. The resources can be resources that are made available through the deployment of the library module. The resources can include JSPs, servlets, class files, tag libraries, compiled classes, static HTML pages, and any other resource that can be made available through a web application. The library module can additionally include a deployment descriptor 320. The deployment descriptor can include information necessary for representing the library module in different GUI tools, elements indicating each module used in the library module, and its type and path in the WAR file storing the library module. Alternately, the library module can include a standard web application deployment descriptor.

Appendix I shows a non-limiting example of one embodiment of the present invention.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nanoscale systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

APPENDIX III

Federated Portal Applications

Functional Specification

Introduction

Purpose

This document describes the federated application and web application capabilities for a portal product such as WebLogic Portal.

DEFINITIONS OF TERMS, ACRONYMS, AND ABBREVIATIONS

WLP—WebLogic Portal, or other portal product
WLS—WebLogic Server, or other server product
WLP_BA—Portal base federated application, can contain EJBs, etc.
WLP_BWA—Portal base federated web application, can contain JSPs, servlets, etc.
WLP_CA—Portal customer application, federated from the WLP_BA, can contain customer created EJBs, etc.
WLP_CWA—Portal customer web application, federated from the WLP_BWA, can contain customer created JSPs, skins, etc.
Consistent Application—a Portal application with all class files derived from a single point in time of the source code. This is the desired state of an app.

Inconsistent Application—a Portal application with class files mixed from incompatible lines of source code. Mixing JAR files from different service packs is a typical cause of this problem.

General Description

Product Perspective

The construction and packaging of the Portal Application has a significant impact on the ability of users to create and deploy Portals and apply Portal service packs. This feature is focused on implementing a Federated Application specification which will simplify the portal development experience and make service packs easier to maintain.

Portal Federated Web Applications enable the packaged delivery and use of portal assets including look and feel assets and portlets. Assets can be packaged and precompiled into a Portal Web Application Library. This library can then be distributed and linked into any Portal Web Application. It can potentially be used to allow the packaging of 'default' look and feels and portlets in customer authored portal web applications, or to allow customers to package their portlets for distribution.

The major goals of the features covered in this document are:

Eliminate the need for developers, administrators, and deployers of portal product-based applications from having understand what portal produce internal components are in use.

Separate the management and deployment of portal produce internals from the custom components developed by the customer.

Make patching and upgrading of portal product internal components a reliable and simple process.

WLP Base Application (WLP_BA)

Functional Description

The WLP_BA contains the immutable components of a Portal enterprise application. These components can be archived into an EAR file and become a library component suitable to be consumed by a WLP_CA.

There may be more than one library module that fulfills the purpose of the WLP_BA. As stated above, can provide WLP_BA instances such as WLP_Full, WLP_Lite, Campaign, Commerce, etc.

Functional Requirements

Figure 5:
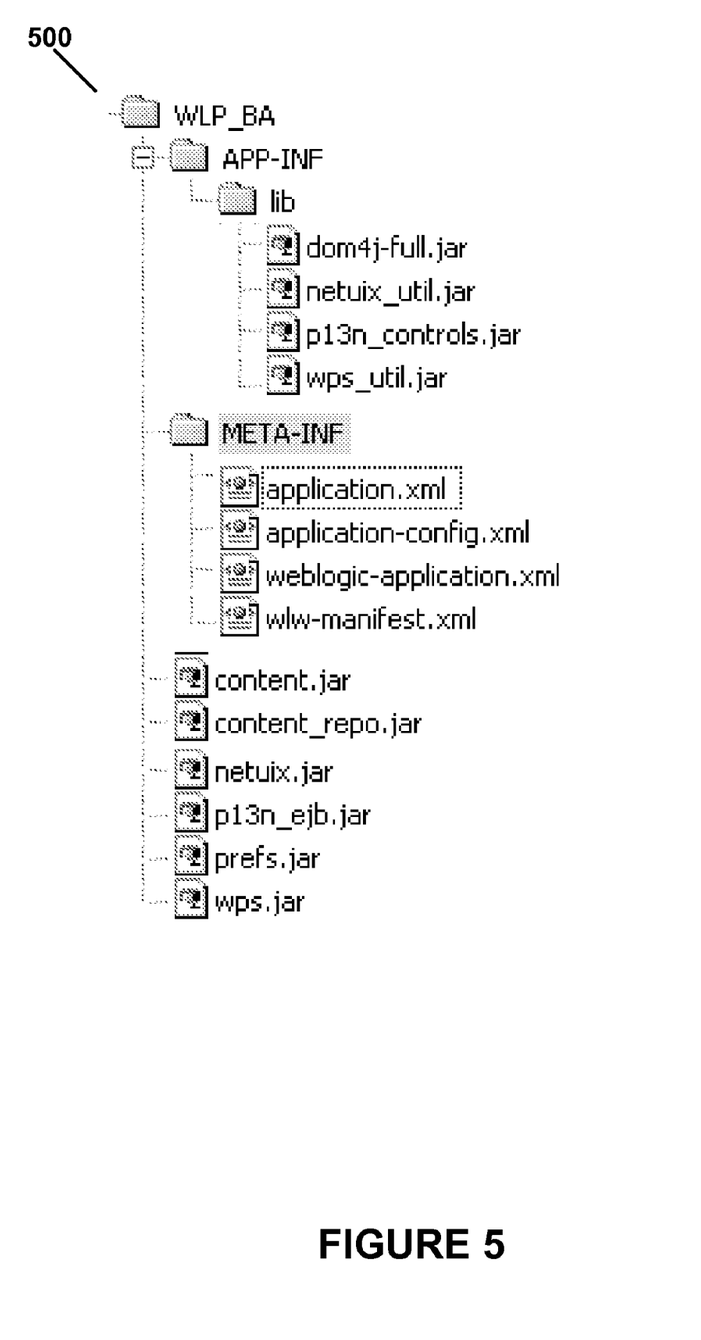
FIG. 5 shows an example WLP Base Application (WLP_BA).

The EAR file contents for the WLP_Full WLP_BA will contain the product application scoped resources. FIG. 5 shows an example WLP Base applicaton (WLP_BA).

Notice the WLP BA 500 has EJB jars, standard libraries, and deployment descriptors. It does not contain webapps or Workshop artifacts (like the workshop directory or the .work file). This structure is archived into an EAR, and then referenced in config.xml and weblogic-application.xml for the WLP_CA.

When the WLP_BA is consumed by a WLP_CA, the WLP_CA may override any classfile in the WLP_BA simply by including the class in the WLP_CA. Any deployment descriptor entry can be overridden through the use of a deployment plan.

WLP Customer Application (WLP_CA)

Functional Description

This application contains the application-scoped components created by the customer. This will include their business logic, legacy application integration code, etc.

Functional Requirements

Figure 6:
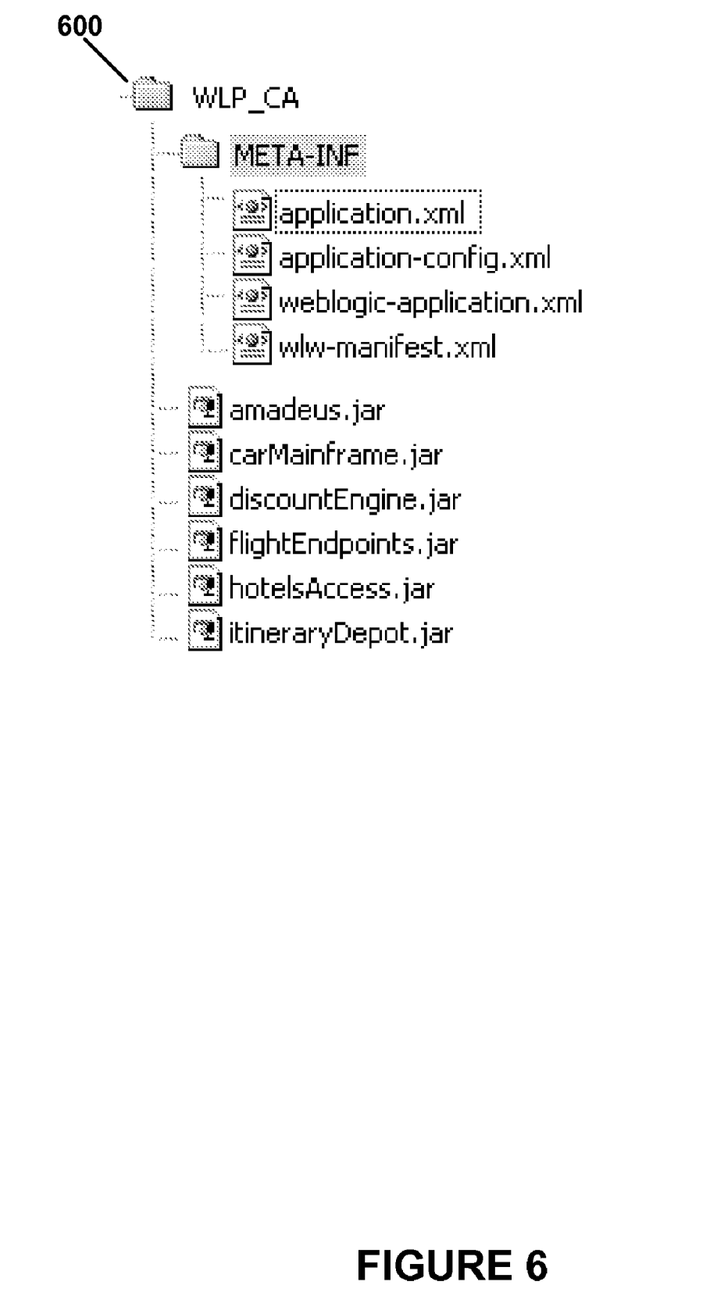
FIG. 6 shows an example WLP Customer Application (WLP_CA).

FIG. 6 shows an example WLP Customer Application (WLP_CA).

Notice that the WLP_CA 600 does not have any stock components of the portal product. This highlights a massive benefit of federated applications for the customer. Its weblogic-application.xml file will contain a reference to the WLP_BA which is registered in config.xml.

WLP Base Web Application (WLP_BWA)

Functional Description

This web application archive contains the base resources used by all portal web applications. These components should not include resources that are commonly modified. The WLP_BWA will be a WAR library module plus one or more JAR library modules (containing the WEB-INF/lib classes). Like the WLP_BA, there may be multiple instances of the WLP_BWA. A pure P13n/Campaign web application would not need resources such as skeletons and the netuix.jar.

Functional Requirements

Figure 7:
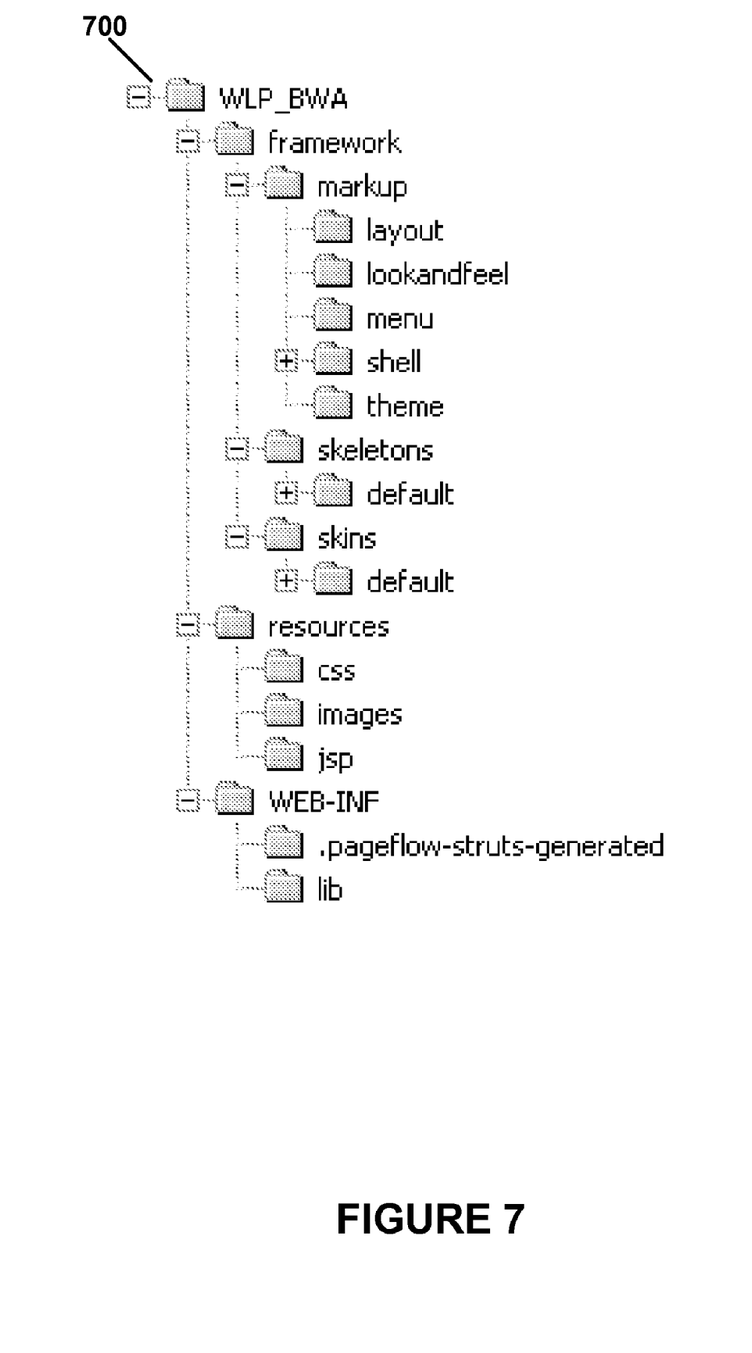
FIG. 7 shows an example Portal WLP Base Web Application (WLP_BWA).

FIG. 7 shows an example Portal WLP Base Web Application (WLP_BWA).

Note that WLP_BWA 700 includes a single Look and Feel ("default"). This will enable portlet vendors to rely on the existence of this default look and feel.

WLP Stock Web Application Components

Functional Description

There are subcomponents of webapps that are provided by the product that would work well as a library. These would include the visitor tools, a login portlet, sample portlets, etc. By packaging these components into the web application library modules, it would simplify their installation into new portals projects. Because these components would likely need modification, the customer would be welcome to change the contents of these modules.

Functional Requirements

Figure 8:
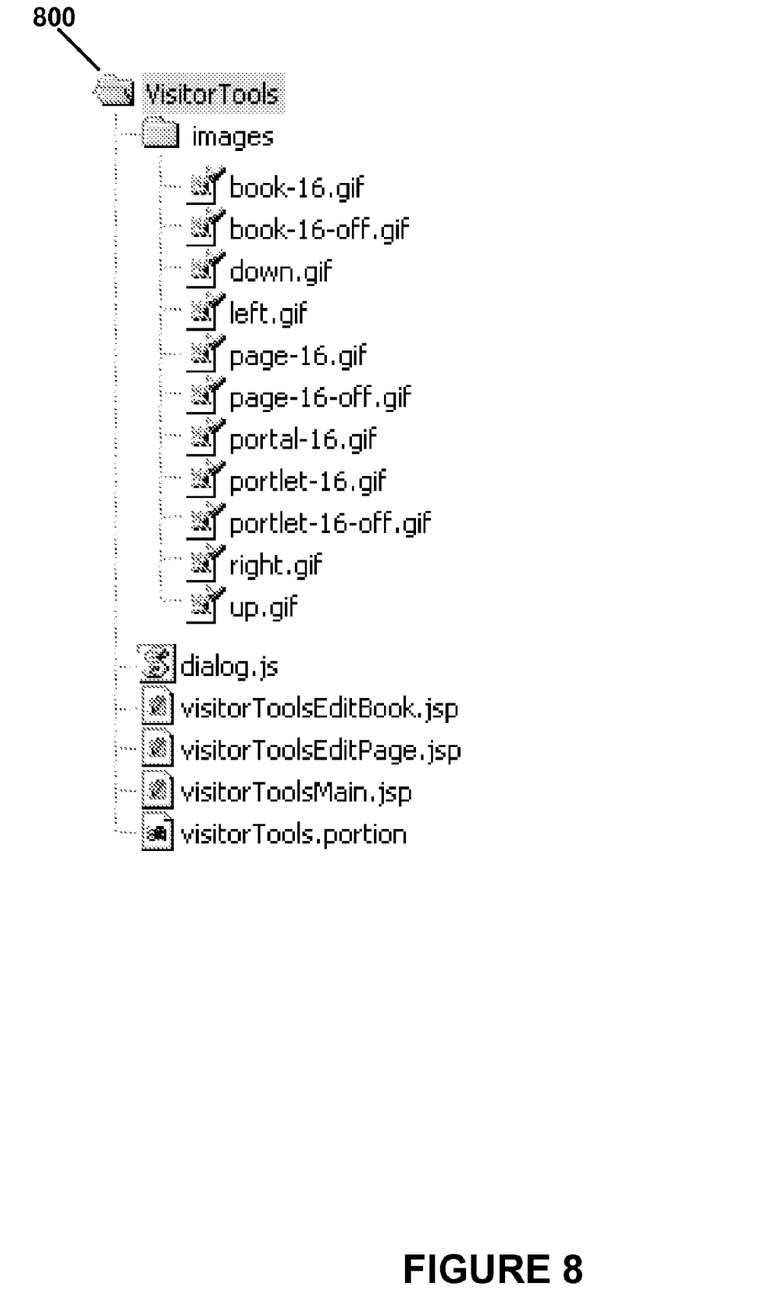
FIG. 8 shows an example web application library module.

FIG. 8 shows an example web application library module. This is how the web application library module would look for the Visitor Tools 800.

WLP Stock Web Applications

Functional Description

The Admin Tool and the Datasync browser components can become library modules, and added as desired by the developer.

Functional Requirements

Existing war files for administration tools and Datasync browsers can be packaged as web application library modules. These then become available to a developer to add to a Portal application.

WLP Customer Web Application (WLP_CWA)

Functional Description

This component is created by the customer to hold the resources specific to their portal web application. It can be a child of the WLP_BWA and contained within a WLP_CA.

Customers can put their JSPs, custom skins, custom skeleton components, custom portlets inside the WLP_CWA. It can inherit the stock portal resources from the WLP_BWA.

Functional Requirements

Figure 9:
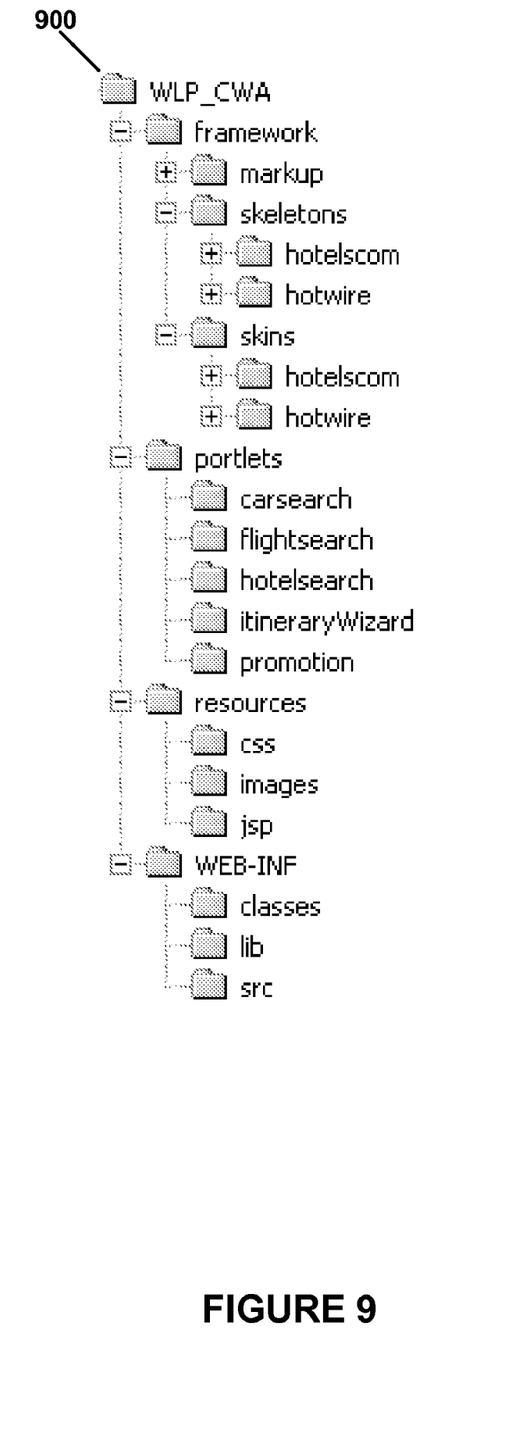
FIG. 9 shows an example WLP Customer Web Application (WLP_CWA).

FIG. 9 shows an example WLP Customer Web Application (WLP_CWA). Notice the portlets and custom skins included in the web application 900:

WLP Application Consistency

Functional Description

The source of countless application problems historically has been inconsistent application code. Federated applications can help prevent consistency problems form occurring. When a service pack is released, customers will not need to update the JARs in their applications and web applications. All the portal product WLP code can deployed in the WLP_BA and WLP_BWA. Since customers should not be modifying those components, a simple rip and replace strategy by the installer will be possible. Customers will not need to do any file copying.

Functional Requirements

The division of the applications into the WLP_BA, WLP_BWA, WLP_CA, WLP_CWA, and other library modules will provide an environment in which application consistency is easy to achieve. There are no new requirements for federated applications.

A detection scheme can be used to alert the deployer via the existing deployment framework when an inconsistency is found.

Portal Product Patching Model

With the introduction of federated applications, a classfile patching model is possible. Patches containing only the affected classfiles can be deployed into WLP_CA and WLP_CWA, which would take precedence over the classfiles deployed in the WLP_BA and WLP_BWA.

Functional Requirements

The existing federated application plan will provide the primary means to enable the new patching model. The existence of the WLP_CA and WLP_CWA will provide the hook needed to make classfile patches work.

Code can be introduced into the service pack installers that identifies or even removes installed patches.

General Requirements

Library Dependency Requirements

In one embodiment, any deployable product code or artifact needs to be located in either the system class path, the WLP_BA, or the WLP_BWA. Furthermore, if the WLP_BA is further reduced into multiple library modules, care must be taken not to create cyclical classloader dependencies between the library modules.

What is claimed is:

1. A system for constructing a portal, the system comprising:
    a computer including a computer readable medium and processor operating thereon;
    a customer portal application, executing on the computer, wherein the customer portal application includes a plurality of files; and
    a plurality of modules, each of which includes additional files;
    wherein the customer portal application further includes a reference to one or more of the modules, and wherein a portal can be constructed from the files in the customer portal application and the additional files in the one or more modules that are referenced by the customer portal application;
    a deployment tool that deploys the one or more modules referenced by the customer portal application, wherein when a request to deploy the customer portal application is received, the deployment tool
        determines those modules that are referenced by the customer portal application,
        deploys those modules, and
        combines the additional files in each of those modules, as deployed, with the files included in the customer portal application, including overriding any files in the modules, as deployed, with the files in the customer portal application having the same filename.

2. The system of claim 1, wherein the files include class files.

3. The system of claim 1, wherein the customer portal application references the module.

4. The system of claim 3, wherein the reference to the module causes module to be deployed.

5. The system of claim 3, wherein the reference is in an XML file of the customer portal application.

6. The system of claim 1, wherein the module is archived into an archive file.

7. The system of claim 1, wherein the module is a base application module.

8. The system of claim 7, wherein the module is an updated base application module.

9. The system of claim 1, wherein the filename includes path info.

10. A system for constructing a portal, the system comprising:
    a computer including a computer readable medium and processor operating thereon;
    a customer portal web application, executing on the computer, wherein the customer portal web application includes a plurality of files; and
    a plurality of web modules, each of which includes additional files which contain portal elements;
    wherein the customer portal web application further includes a reference to one or more of the web modules, and wherein a portal can be constructed from the files in the customer portal web application and the additional files in the one or more web modules that are referenced by the customer portal web application;

a deployment tool that deploys the one or more web modules referenced by the customer portal web application, wherein when a request to deploy the customer portal web application is received, the deployment tool determines those web modules that are referenced by the customer portal web application, deploys those web modules, and combines the additional files in each of those web modules, as deployed, with the files included in the customer portal web application, including overriding any files in the web modules, as deployed, with the files in the customer portal web application having the same filename.

11. The system of claim 10, wherein the customer web portal application is part of a customer portal application.

12. The system of claim 11, wherein a file of customer portal application is an archive file of the customer web portal application.

13. The system of claim 10, wherein the web module is a base web module and each customer web portal application inherits the base web module.

14. The system of claim 10, wherein customer web portal application references the web module.

15. The system of claim 14, wherein the reference to the web module causes the web module to be deployed.

16. The system of claim 10, wherein the files include class files.

17. The system of claim 10, wherein the web module is archived into an archive file.

18. The system of claim 10, wherein the filename includes path info.

19. The system of claim 1, wherein:

the plurality of modules include a base application module and a library module; and the plurality of modules are loaded in an order specified by the customer portal application.

20. The system of claim 10, wherein:

the plurality of web modules include a base application module and a library module; and the plurality of modules are loaded in an order specified by the customer portal application.

21. A method of constructing portals, the method comprising:

providing a computer including a computer readable medium and processor operating thereon;

providing a customer portal application, executing on the computer, wherein the customer portal application includes a plurality of files;

providing a plurality of modules, each of which includes additional files;

wherein the customer portal application further includes a reference to one or more of the modules, and wherein a portal can be constructed from the files in the customer portal application and the additional files in the one or more modules that are referenced by the customer portal application;

providing a deployment tool that is operable to deploy the one or more modules referenced by the customer portal application;

receiving a request to deploy the customer portal application;

determining, by the deployment tool, those modules that are referenced by the customer portal application, deploying, by the deployment tool, those modules, and combining, by the deployment tool, the additional files in each of those modules, as deployed, with the files included in the customer portal application, including overriding any files in the modules, as deployed, with the files in the customer portal application having the same filename.

* * * * *